(12) United States Patent
Kadway et al.

(10) Patent No.: US 12,315,222 B2
(45) Date of Patent: May 27, 2025

(54) ENERGY EFFICIENT HIERARCHICAL SNN ARCHITECTURE FOR CLASSIFICATION AND SEGMENTATION OF HIGH-RESOLUTION IMAGES

(71) Applicant: Tata Consultancy Services Limited, Mumbai (IN)

(72) Inventors: Chetan Sudhakar Kadway, Nagpur (IN); Arpan Pal, Kolkata (IN); Sounak Dey, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 460 days.

(21) Appl. No.: 18/049,186

(22) Filed: Oct. 24, 2022

(65) Prior Publication Data
US 2023/0154154 A1 May 18, 2023

(30) Foreign Application Priority Data
Nov. 16, 2021 (IN) .............................. 202121052643

(51) Int. Cl.
*G06V 10/764* (2022.01)
*G06T 7/11* (2017.01)
(Continued)

(52) U.S. Cl.
CPC ............. *G06V 10/764* (2022.01); *G06T 7/11* (2017.01); *G06T 7/62* (2017.01); *G06V 10/82* (2022.01); *G06V 20/13* (2022.01)

(58) Field of Classification Search
CPC ...... G06V 10/764; G06V 10/82; G06V 20/13; G06V 10/26; G06T 7/11; G06T 7/62
See application file for complete search history.

(56) References Cited

U.S. PATENT DOCUMENTS

| | | | |
|---|---|---|---|
| 10,410,092 B1 * | 9/2019 | Chen | G06V 10/764 |
| 2017/0068871 A1 * | 3/2017 | Abdulkader | G06V 10/56 |

(Continued)

OTHER PUBLICATIONS

Luotamo, Markku, Sari Metsämäki, and Arto Klami. "Multiscale cloud detection in remote sensing images using a dual convolutional neural network." IEEE Transactions on Geoscience and Remote Sensing 59.6 (2020): 4972-4983. (Year: 2020).*

(Continued)

*Primary Examiner* — Oneal R Mistry
*Assistant Examiner* — Jongbong Nah
(74) *Attorney, Agent, or Firm* — Finnegan, Henderson, Farabow, Garrett & Dunner, LLP

(57) ABSTRACT

State of art techniques rely of FPGA based approaches when power efficiency is of concern. However, compared to SNN on Neuromorphic hardware, ANN on FPGA requires higher power and longer design cycles to deploy neural network on hardware accelerators. Embodiments of the present disclosure provide a method and system for energy efficient hierarchical multi-stage SNN architecture for classification and segmentation of high-resolution images. Patch-to-patch-class classification approach is used, where the image is divided into smaller patches, and classified at first stage into multiple labels based on percentage coverage of a parameter of interest, for example, cloud coverage in satellite images. The image portion corresponding to the partially covered patches is divided into further smaller size patches, classified by a binary classifier at second level of classification. Labels across multiple SNN classifier levels are aggregated to identify segmentation map of the input image in accordance with the coverage parameter of interest.

20 Claims, 17 Drawing Sheets

(51) Int. Cl.
    *G06T 7/62*          (2017.01)
    *G06V 10/82*       (2022.01)
    *G06V 20/13*       (2022.01)

(56) References Cited

U.S. PATENT DOCUMENTS

2019/0095787 A1* 3/2019 Kung .................. G06V 10/764
2020/0272899 A1* 8/2020 Dunne .................... G06N 3/08

OTHER PUBLICATIONS

Kucik, Andrzej S. et al., "Investigating Spiking Neural Networks for Energy-Efficient On-Board AI Applications. A Case Study in Land Cover and Land Use Classification", EEE/CVF Conference on Computer Vision and Pattern Recognition Workshops (CVPRW), Date: 2021, Publisher: IEEE, https://openaccess.thecvf.com/content/CVPR2021W/AI4Space/papers/Kucik_Investigating_Spiking_Neural_Networks_for_Energy-Efficient_On-Board_AI_Applications._A_CVPRW_2021_paper.pdf.

Misra, Debaleena et al., "Patch-based CNN evaluation for bark classification", European Conference on Computer Vision, Date: Oct. 2020, pp. 197-212, Publisher: Nature, https://www.researchgate.net/publication/348205261_Patch-Based_CNN_Evaluation_for_Bark_Classification/link/6042a0024585154e8c79f762/download.

Kowsari, Kamran et al., "HMIC: Hierarchical Medical Image Classification, A Deep Learning Approach", Information, Date: Jun. 2020, vol. 11(6), Publisher: NCBI, https://www.mdpi.com/2078-2489/11/6/318.

\* cited by examiner

| PATCH SIZES (Columns) | 4 | 8 | 16 | 32 | 64 |
|---|---|---|---|---|---|
| %THRESHOLD (Rows) | 4 | 8 | 16 | 32 | 64 |
| 0.0 | 0.000000 | 0.000000 | 0.000000 | 0.000000 | 0.000000 |
| 0.1 | 1.600000 | 6.400000 | 25.600000 | 102.400000 | 409.600000 |
| 0.2 | 3.200000 | 12.800000 | 51.200000 | 204.800000 | 819.200000 |
| 0.3 | 4.800000 | 19.200000 | 76.800000 | 307.200000 | 1228.800000 |
| 0.4 | 6.400000 | 25.600000 | 102.400000 | 409.600000 | 1638.400000 |
| 0.5 | 8.000000 | 32.000000 | 128.000000 | 512.000000 | 2048.000000 |
| 0.75 | 12.000000 | 48.000000 | 192.000000 | 768.000000 | 3072.000000 |
| 1.0 | 16.000000 | 64.000000 | 256.000000 | 1024.000000 | 4096.000000 |
| 5.0 | 80.000000 | 320.000000 | 1280.000000 | 5120.000000 | 20480.000000 |
| 7.5 | 120.000000 | 480.000000 | 1920.000000 | 7680.000000 | 30720.000000 |
| 10.0 | 160.000000 | 640.000000 | 2560.000000 | 10240.000000 | 40960.000000 |
| 15.0 | 240.000000 | 960.000000 | 3840.000000 | 15360.000000 | 61440.000000 |
| 20.0 | 320.000000 | 1280.000000 | 5120.000000 | 20480.000000 | 81920.000000 |
| 25.0 | 400.000000 | 1600.000000 | 6400.000000 | 25600.000000 | 102400.000000 |
| 30.0 | 480.000000 | 1920.000000 | 7680.000000 | 30720.000000 | 122880.000000 |
| 35.0 | 560.000000 | 2240.000000 | 8960.000000 | 35840.000000 | 143360.000000 |
| 40.0 | 640.000000 | 2560.000000 | 10240.000000 | 40960.000000 | 163840.000000 |
| 45.0 | 720.000000 | 2880.000000 | 11520.000000 | 46080.000000 | 184320.000000 |
| 50.0 | 800.000000 | 3200.000000 | 12800.000000 | 51200.000000 | 204800.000000 |

Threshold Area Coverage grid [threshold-rows Vs patch-size-columns]

FIG. 3C

| PATCH SIZES (COLUMNS) | 4 | 8 | 16 | 32 | 64 |
|---|---|---|---|---|---|
| % THRESHOLD (ROWS) | 4 | 8 | 16 | 32 | 64 |
| 0.0 | 0.878801 | 0.806450 | 0.726974 | 0.606396 | 0.394985 |
| 0.1 | 0.878801 | 0.806450 | 0.726974 | 0.609497 | 0.402542 |
| 0.2 | 0.878801 | 0.806450 | 0.726974 | 0.612105 | 0.413742 |
| 0.3 | 0.878801 | 0.806450 | 0.726974 | 0.615572 | 0.425915 |
| 0.4 | 0.878801 | 0.806450 | 0.731032 | 0.618350 | 0.440610 |
| 0.5 | 0.878801 | 0.806450 | 0.731032 | 0.622141 | 0.456978 |
| 0.75 | 0.878801 | 0.806450 | 0.731032 | 0.628761 | 0.489171 |
| 1.0 | 0.878801 | 0.806450 | 0.733790 | 0.638178 | 0.514110 |
| 5.0 | 0.878801 | 0.825962 | 0.764692 | 0.721719 | 0.684636 |
| 7.5 | 0.892938 | 0.830996 | 0.780909 | 0.745673 | 0.724926 |
| 10.0 | 0.892938 | 0.839890 | 0.792215 | 0.757566 | 0.740664 |
| 15.0 | 0.901387 | 0.851654 | 0.810337 | 0.779066 | 0.752384 |
| 20.0 | 0.909815 | 0.859758 | 0.817402 | 0.786432 | 0.758537 |
| 25.0 | 0.917149 | 0.867088 | 0.823051 | 0.785709 | 0.754202 |
| 30.0 | 0.917149 | 0.869493 | 0.824291 | 0.783705 | 0.753848 |
| 35.0 | 0.919659 | 0.870144 | 0.822507 | 0.779147 | 0.753312 |
| 40.0 | 0.920906 | 0.868218 | 0.819385 | 0.775170 | 0.750154 |
| 45.0 | 0.920032 | 0.865811 | 0.814140 | 0.767712 | 0.746744 |
| 50.0 | 0.916258 | 0.860582 | 0.809701 | 0.761547 | 0.746744 |

0.5*(Pixelwise Accuracy) + 0.5*(Mean IoU) grid
[threshold-rows Vs patch-size-columns]
FIG. 3D

ENERGY EFFICIENT HIERARCHICAL SNN ARCHITECTURE FOR CLASSIFICATION AND SEGMENTATION OF HIGH-RESOLUTION IMAGES

PRIORITY CLAIM

This U.S. patent application claims priority under 35 U.S.C. § 119 to: Indian Patent Application No. 202121052643, filed on 16 Nov. 2021. The entire contents of the aforementioned application are incorporated herein by reference.

TECHNICAL FIELD

The embodiments herein generally relate to field of high-resolution image processing and, more particularly, to a method and system for energy efficient hierarchical multi-stage Spiking Neural Network (SNN) architecture for classification and segmentation of high-resolution images.

BACKGROUND

On board processing or edge processing is needed for real time, quick inference applications, wherein power remains one of the major constraints for such processing approaches. Further, with seamless inflow of data to be processed, with data being high-resolution images, power constraint problem further intensifies. In case of satellites having multi-spectral/hyperspectral imaging capability, vast amount of data is generated. This huge volume of imagery data consumes a lot of onboard satellite storage, and further the communication bandwidth, when such image data is sent to ground station. Traditionally, satellites act as store and forward sensor instrument and ground station acts as data collection and processing node, known as Bent-Pipe architecture. With the Bent-Pipe architecture, where ground station acts as command-and-control center satellites consume considerable communication bandwidth in transferring all the captured image data as-is to the ground station. The ground station then filters the data of interest for inferencing. Thus, this traditional approach is time consuming, power consuming and communication bandwidth consuming.

SUMMARY

Embodiments of the present disclosure present technological improvements as solutions to one or more of the above-mentioned technical problems recognized by the inventors in conventional systems.

For example, in one embodiment, a method for energy efficient hierarchical multi-stage Spiking Neural Network (SNN) architecture for classification and segmentation of high-resolution images is provided. The method includes receiving a high-resolution image, via an imaging hardware. Dividing via the neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier.

Further, the method includes performing via the neuromorphic platform, a multi-class classification of each patch of the plurality of first size patches based on the plurality of threshold values determined for the first SNN classifier of the neuromorphic platform, from among the plurality of SNN classifiers. Each patch is assigned a class label by the first SNN classifier for a classification objective, wherein the class labels comprise one of a) the clean patch b) the partially covered patch and c) the completely covered patch.

Further, the method includes identifying via by the neuromorphic platform, a partial image of the high-resolution image that correspond to patches labelled as partially covered patch and dividing the identified partial image into a plurality of second size patches.

Further, the method includes performing via the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch.

Furthermore, the method includes generating via the neuromorphic platform, a patch level segmentation map of the high-resolution image by aggregating class labels at each level.

Further, the method includes computing an overall percentage cover for the high-resolution image by analyzing area covered by the patches labelled as clean patches based on the class labels at each level, and marking the high-resolution image as a highly covered image if the overall percentage cover of the high-resolution image is above a predefined cover threshold.

In another aspect, a system for energy efficient hierarchical multi-stage Spiking Neural Network (SNN) architecture for classification and segmentation of high-resolution images is provided. The system comprises a memory storing instructions; one or more Input/Output (I/O) interfaces; and one or more hardware processors coupled to the memory via the one or more I/O interfaces, wherein the one or more hardware processors and the neuromorphic platform are configured by the instructions to receive a high-resolution image, via an imaging hardware and divide via the neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier.

Further, the system includes performing via the neuromorphic platform, a multi-class classification of each patch of the plurality of first size patches based on the plurality of threshold values determined for the first SNN classifier of the neuromorphic platform, from among the plurality of SNN classifiers. Each patch is assigned a class label by the first SNN classifier for a classification objective, wherein the class labels comprise one of a) the clean patch b) the partially covered patch and c) the completely covered patch.

Further, the system includes identifying via by the neuromorphic platform, a partial image of the high-resolution image that correspond to patches labelled as partially covered patch and dividing the identified partial image into a plurality of second size patches.

Further, the system includes performing via the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch.

Furthermore, the system includes generating via the neuromorphic platform, a patch level segmentation map of the high-resolution image by aggregating class labels at each level.

Further, the system includes computing an overall percentage cover for the high-resolution image by analyzing area covered by the patches labelled as clean patches based on the class labels at each level, and marking the high-resolution image as a highly covered image if the overall percentage cover of the high-resolution image is above a predefined cover threshold.

In yet another aspect, there are provided one or more non-transitory machine-readable information storage mediums comprising one or more instructions, which when executed by one or more hardware processors causes a method for energy efficient hierarchical multi-stage Spiking Neural Network (SNN) architecture for classification and segmentation of high-resolution images is provided. The method includes receiving a high-resolution image, via an imaging hardware. Dividing via the neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier.

Further, the method includes performing via the neuromorphic platform, a multi-class classification of each patch of the plurality of first size patches based on the plurality of threshold values determined for the first SNN classifier of the neuromorphic platform, from among the plurality of SNN classifiers. Each patch is assigned a class label by the first SNN classifier for a classification objective, wherein the class labels comprise one of a) the clean patch b) the partially covered patch and c) the completely covered patch.

Further, the method includes identifying via by the neuromorphic platform, a partial image of the high-resolution image that correspond to patches labelled as partially covered patch and dividing the identified partial image into a plurality of second size patches.

Further, the method includes performing via the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch.

Furthermore, the method includes generating via the neuromorphic platform, a patch level segmentation map of the high-resolution image by aggregating class labels at each level.

Further, the method includes computing an overall percentage cover for the high-resolution image by analyzing area covered by the patches labelled as clean patches based on the class labels at each level, and marking the high-resolution image as a highly covered image if the overall percentage cover of the high-resolution image is above a predefined cover threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3B depicts example satellite images depicting binary change detection and FIG. 3C and FIG. 3D depict a grid generated for a tuple of five metrics defining a size-performance criteria to, wherein the grid is used to obtain a patch-size and coverage percentage threshold, in accordance with some embodiments of the present disclosure.

Figure 1A:
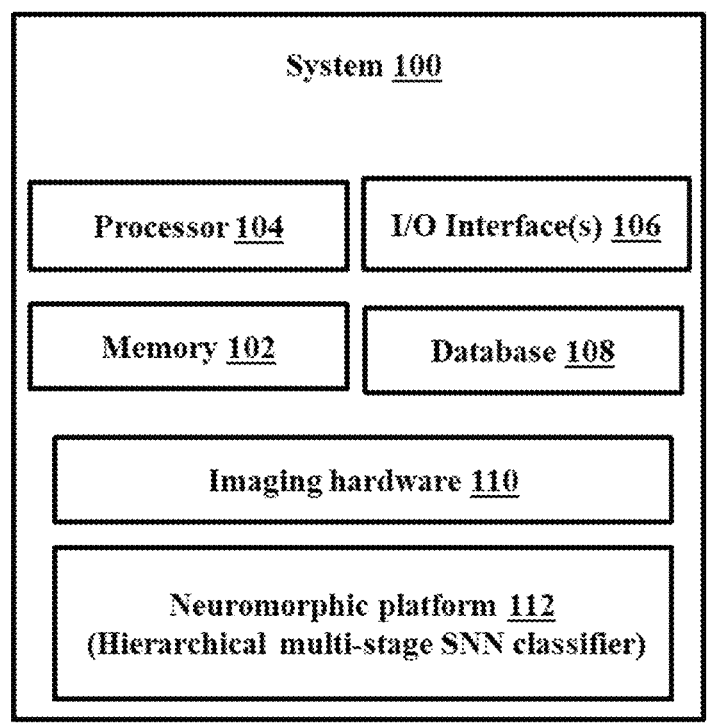
FIG. 1A is a functional block diagram of a system for energy efficient hierarchical multi-stage Spiking Neural Network (SNN) architecture for classification and segmentation of high-resolution images, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Optimally utilizing resources is critical in a resource constraint environment such as onboard processing platforms or edge devices that face constraints in terms of memory, power, communication bandwidth etc. Communication bandwidth can be reduced by performing inferencing onboard to generate approximate meta-data that enables sending only selective data data of interest) to the control units and discard unwanted data. To perform onboard inferencing, Conventional Convolutional Neural Networks (CNN) when run on conventional CPU's or GPU's consume high power which is above the power budget of resource contained edge devices, like those onboard satellites. Thus, CNNs running on conventional CPUs & GPUs are not suitable for resource constraint environments. Field-programmable gate array (FPGA) are first choice for Neural Network hardware acceleration and in comparison to conventional CPU/GPU offer enhanced power efficiency.

Embodiments of the present disclosure provide a method and system for energy efficient hierarchical multi-stage Spiking Neural Network (SNN) architecture for classification and segmentation of high-resolution images. Spiking Neural Networks (SNN) running on neuromorphic platform consumes less power and requires shorter design cycles to deploy neural network on hardware accelerator (neuromorphic) as compared to deploying CNN on FPGA. The SNN architecture disclosed herein is based a patch-to-patch-class classification approach, where a high-resolution imagery is divided into smaller patches, and classified at first stage into multiple labels based on percentage coverage of a parameter of interest, for example, cloud coverage in satellite images. The image portion corresponding to the partially covered patches is further divided into smaller size patches, which are classified by a binary classifier at second level of classification. The labels across multiple SNN classifier levels are aggregated to identify segmentation map of the input image in accordance with the coverage parameter of interest. The patch-based approach saves power over conventional pixel-based approach, and the patch level classification makes it eligible for distributed inference over a satellite constellation, in typical satellite onboard data processing applications. The hierarchical classification approach with reduced patch-size at each level enables to save power and increase granularity of classification.

Works in the art propose general review on usage of SNN for onboard processing to achieve energy efficient system, however, do not provide any light on the SNN architecture to be used, unlike the hierarchical multi-stage SNN architecture disclosed herein.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1A is a functional block diagram of a system 100 for energy efficient hierarchical multi-stage Spiking Neural Network (SNN) architecture for classification and segmentation of high-resolution images, in accordance with some embodiments of the present disclosure.

In an embodiment, the system 100 provides a neuromorphic platform 112, wherein a hierarchical multi-stage SNN classifier is deployed. Further, the system 100 comprises a processor(s) 104, communication interface device(s), alternatively referred as input/output (I/O) interface(s) 106, one or more data storage devices or a memory 102 operatively coupled to the processor(s) 104, and an imaging hardware 110 to capture high-resolution images such as satellite imagery. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones that are functioning as edge devices or onboard processing platforms. The I/O interface(s) 106 can include a variety of software and hardware interfaces, for example, to capture the high-resolution images and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices such as satellite constellations and/or central control units such as ground stations in satellite systems. The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 includes modules such as preprocessing module (not shown) for calibration of captured high-resolution images. The database 108, may also store the captured high-resolution images, the preprocessed images and the resultant segmentation maps post processing the preprocessed images. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

The neuromorphic platform 112 has two main sub-system namely 'Spike Converter' (not shown explicitly) and 'Neuromorphic Accelerator' (not shown explicitly). A neuromorphic accelerator in general is a hardware accelerator specifically designed to run Graph like architectures or Neural Networks like architectures (operating in event domain) at very-low power. These neuromorphic accelerators have BUS connectivity to existing sub-systems like the CPU and the memory controllers, in order to take input data, then process it and return the output. Functions of the components of the system 100 are explained in conjunction with FIG. 1B through 5B.

Figure 1B:
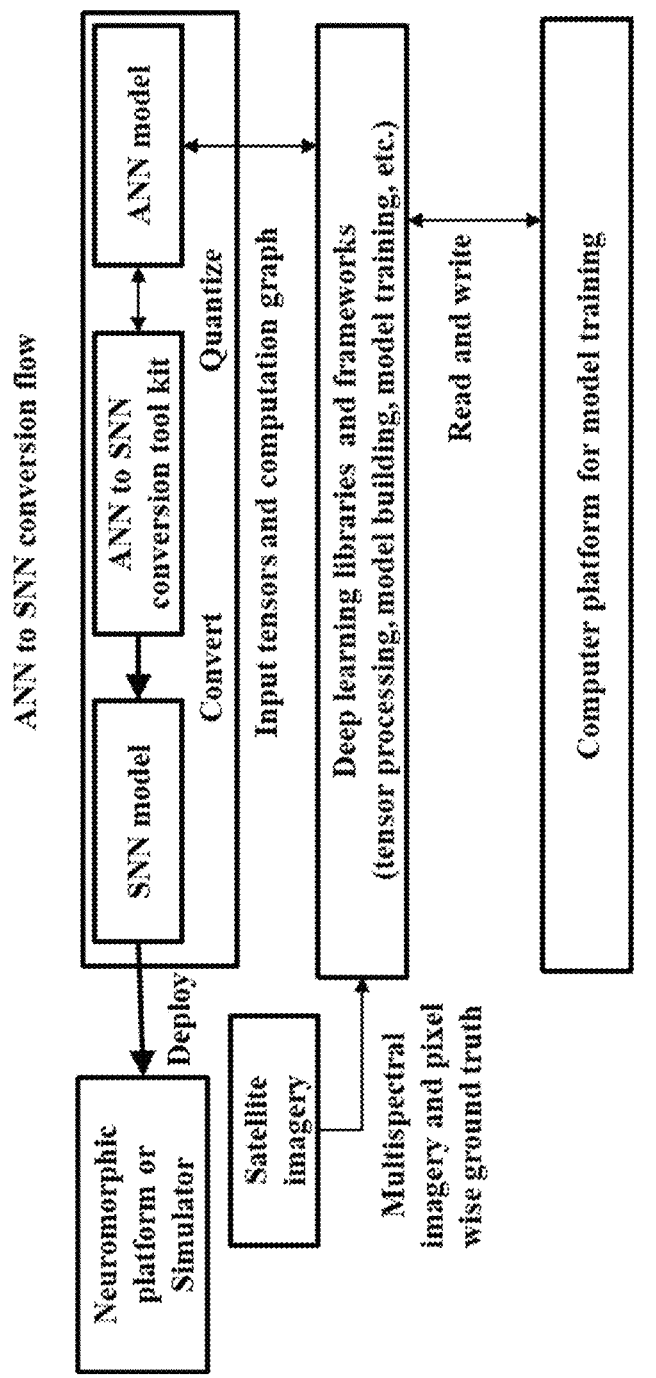
FIG. 1B illustrates an example architecture and process overview of deployment of the hierarchical multi-stage SNN classifier via an example neuromorphic platform used by the system of FIG. 1 for classification and segmentation of multispectral imagery, in accordance with some embodiments of the present disclosure.

FIG. 1B illustrates an example architecture and process overview of deployment of the hierarchical multi-stage SNN classifier in an example neuromorphic platform as used by the system of FIG. 1 for classification and segmentation of multispectral imagery, in accordance with some embodiments of the present disclosure. FIG. 1B depicts an Artificial Neural Network (ANN) model training, conversion to SNN and deployment on Neuromorphic Platform. As depicted, prior to training of the CNN and generating the hierarchical SNN architecture, image patches and their corresponding labels are generated from publicly available Sentinel-2 Cloud Mask Catalogue data-set. Dataset, which contains Sentinel-2 13-channel 1022x1022 px multispectral images and their corresponding pixel-level cloud mask (also known as segmentation map). Label for each patch is generated by applying a threshold on percentage coverage of parameter of interest (typically herein % of cloudy pixels) in that patch. Thereafter, a Custom CNN (a type of Artificial Neural Network (ANN)) model training on stage-1 (64x64 px) and stage-2 (8x8 px) patches is performed. Once these CNNs are obtained, ANN to SNN conversion path is chosen to obtain SNNs (corresponding to various stages) deployable on neuromorphic hardware. The hierarchical multi-stage SNN classifier comprises a plurality of SNN classifiers. Each of the plurality of SNN classifiers except a last SNN classifier is a multi-class classifier with classification into two or more labels, whereas the last stage classifier is a binary classifier. A number of levels, or hierarchical levels, formed by the plurality of SNN classifiers in the hierarchical multi-stage SNN classifier, during onboard classification and segmentation of high-resolution image, is defined as a function of size of object of interest in meters, spatial resolution of the high-resolution image in meters, and a combined power budget of a single satellite and other factors of interest based on end application.

Figure 2A:
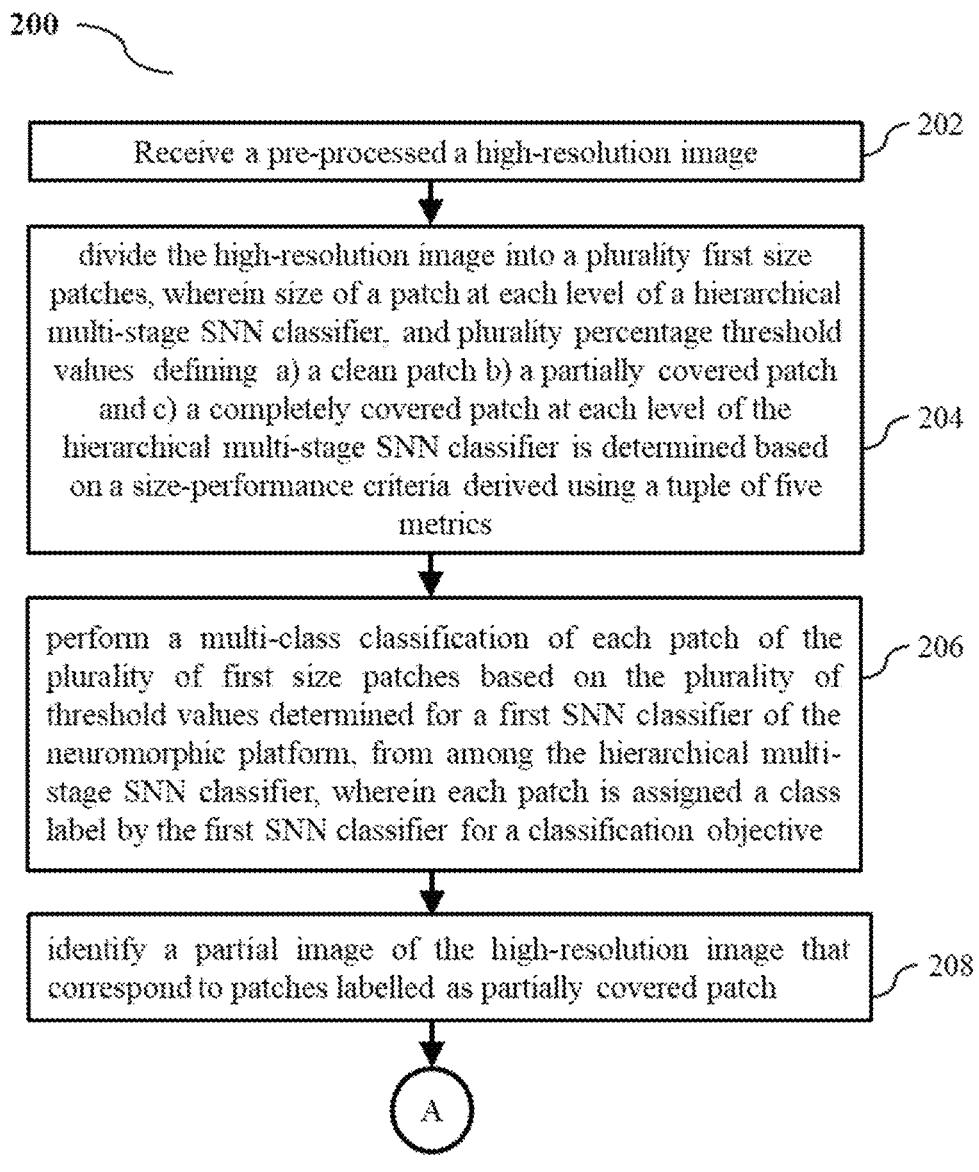
FIGS. 2A and 2B (collectively referred as FIG. 2) is a flow diagram illustrating a method for energy efficient hierarchical multi-stage SNN architecture for classification and segmentation of high-resolution images, using the system of FIG. 1, in accordance with some embodiments of the present disclosure.
Figure 2B:
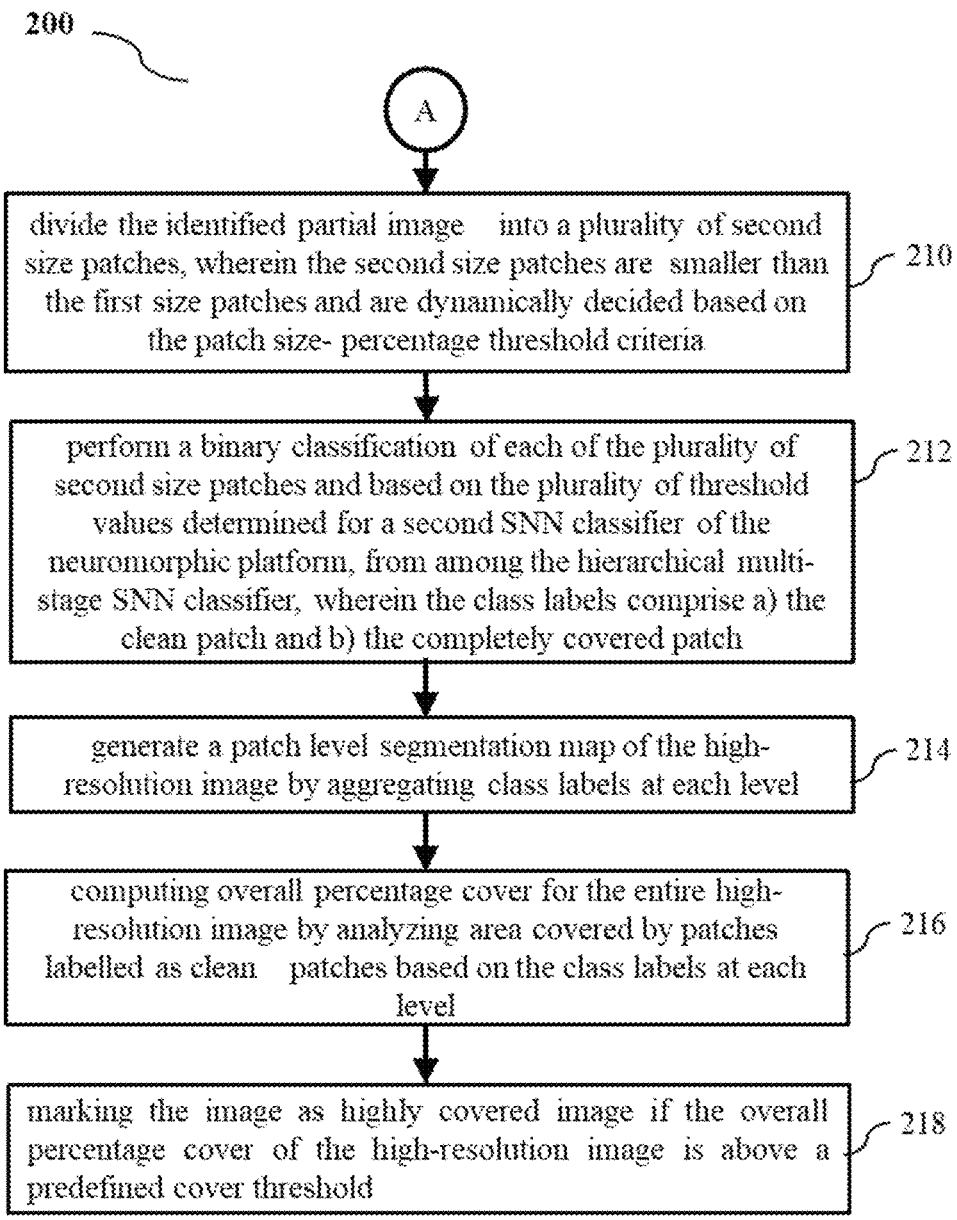

FIGS. 2A and 2B (collectively referred as FIG. 2) is a flow diagram illustrating a method 200 for energy efficient hierarchical multi-stage SNN architecture for classification and segmentation of high-resolution images, using the system of FIG. 1, in accordance with some embodiments of the present disclosure.

As depicted in FIG. 1B, the converted trained CNN to the hierarchical multi-stage SNN classifier is deployed in the system 100 (neuromorphic platform on board or on an edge device). The neuromorphic platform along with the one or more hardware processor together is configured execute steps of the method 200, as described below. The steps of the method 200 of the present disclosure will now be explained with reference to the components or blocks of the system 100 as depicted in FIGS. 1A and 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3A:
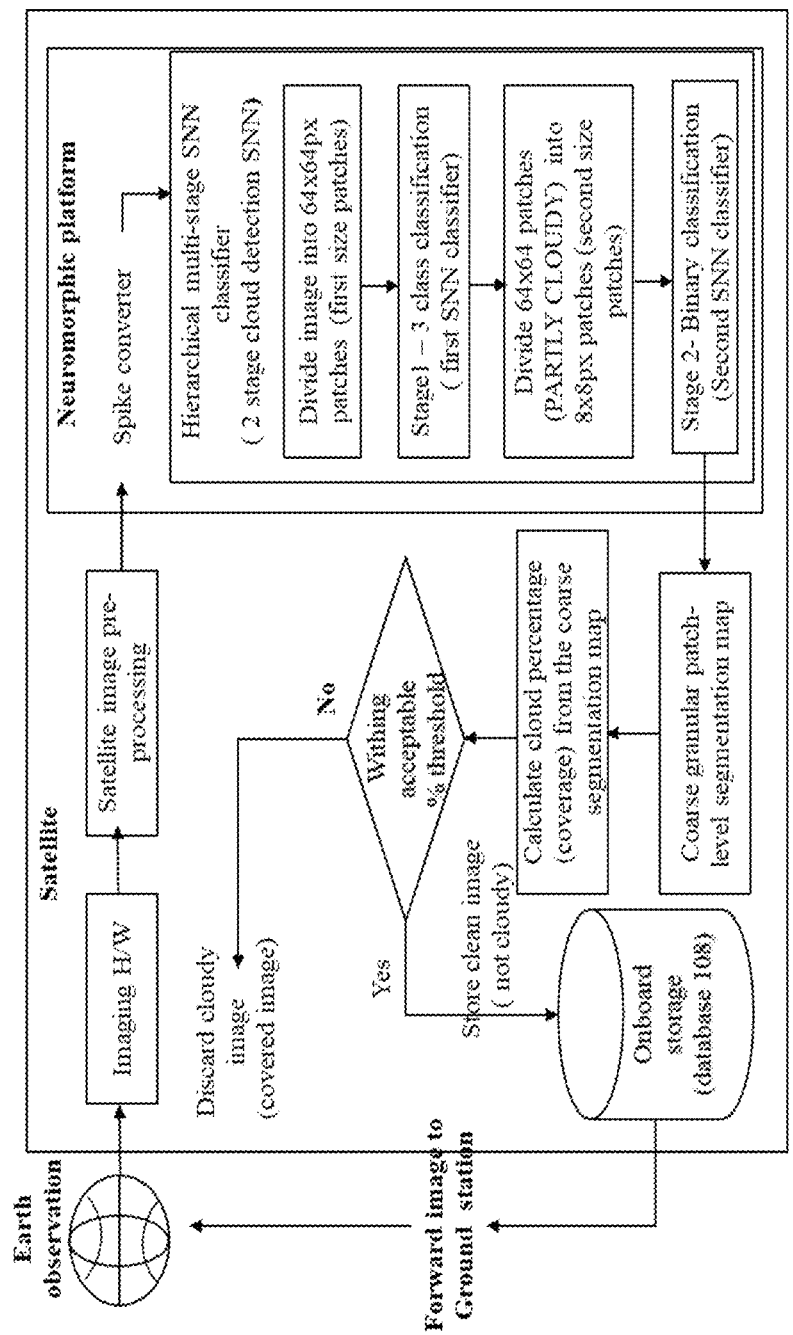
FIG. 3A is an example process overview of satellite on board processing of acquired high-resolution earth imagery using the system FIG. 1 implementing energy efficient hierarchical multi-stage SNN architecture for classification and segmentation, in accordance with some embodiments of the present disclosure.

The steps of the method 200 are explained in conjunction with architecture and process overview of an example satellite onboard processing system for cloud cover detection as depicted in FIG. 3A, which is based on the hierarchical multi-stage SNN classifier disclosed herein. Referring to steps of method 200, at step 202 of the method 200, a high-resolution image is received via the imaging hardware 110. The received image is pre-processed and prepared for further processing. In typical satellite onboard processing example of FIG. 3A, the preprocessing comprises geometric and radio metric calibration, to obtain a calibrated image. The calibrated image is then forwarded to the neuromorphic platform 112. FIG. 3A shows how hierarchical SNN architecture is used in satellite data processing pipeline to early discard unusable CLOUDY (having cloud cover in the image above a certain cover threshold or percentage threshold) satellite images (by comparing approximate estimate of % cloudy pixels with a threshold) and send clear images to ground station. Once clear images are moved to onboard storage (database 108), further processing like data compression and high-level applications (e.g., target detection, LULC classification and change detection) can be performed onboard or in ground station. Only CLEAR (having cloud cover below the cover threshold or percentage threshold) images are provided over the communication channel of the satellite to ground station. The satellite imagery onboard processing and inferencing depicted in FIG. 3A is one use case example, and the method 200 can be used for any similar high-resolution image inferencing such as in medical domain, and when operating in resource constraint environments. Steps 204 through 218 below explain the process of inferencing process to determine the images of interest.

Referring back to method 200, at step 204, the neuromorphic platform 112 of the system 100 divides the high-resolution image into a plurality first size patches. A patch-size at each level of the hierarchical multi-stage SNN classifier, along with plurality percentage threshold values defining a) a clean patch, b) a partially covered patch, and c) a completely covered patch at each level of the hierarchical multi-stage SNN classifier is determined based on a size-performance criteria. The size-performance criteria are derived using a tuple of five metrics (also referred 5-metrics tuple) comprising: a) threshold pixel coverage, b) threshold area coverage, c) pixelwise accuracy, d) classwise-Intersection over Union (IoU), and e) Mean-IoU. The size-performance criteria enable to pick patch-size+threshold, wherein the size constraint refers to size of object of interest in an end-application and performance criteria refers to acceptable performance for the patch-level classification model of the SNN architecture. The performance is critical to be considered as there is bound to be performance drop going from pixel to patch level based classification approach. The patch-size and the plurality of threshold values at each level are dynamically tunable based on requirements set by end application for which segmentation is carried out and are chosen prior to model training of each of the hierarchical multi-stage SNN classifier, based on a grid generated for each of the five metrics. The patch-size decreases gradually from a first SNN classifier to a last SNN classifier of a plurality of SNN classifiers of the hierarchical multi-stage SNN classifier. The grid of each of the five metrics is used as a guide to select appropriate patch-size and percentage threshold for each of the SNN classifiers in the hierarchical multi-stage SNN classifier. The metrics within each grid cell of the grid are calculated between a ground truth pixel-level segmentation maps and a generated patch-level segmentation map post patch-size and percentage threshold selection. The grids are explained with reference to FIGS. 3A through 3C.

a) The threshold pixel coverage refers to capability of a perfect-CNN (trained patch-level CNN tuned for highest performance) classifier to detect coverage within the patch to at least as many pixels as this metric.

b) The threshold area coverage refers to capability of the perfect-CNN (patch-level) classifier to detect coverage within the patch to at least as many square-meter area as this metric.

c) The pixelwise accuracy refers to a maximum pixelwise accuracy achieved by the perfect-CNN classifier with specific patch-size and percentage threshold combination.

d) The classwise-IoU refers to a maximum classwise-IoU achieved by the perfect-CNN classifier with the specific patch-size and percentage threshold combination.

e) The mean-IoU is a Jaccard Index referring to a maximum Mean-IoU achieved by the perfect-CNN classifier achieved with the specific patch-size and percentage threshold combination.

The patch-size determination based on the 5-metrics tuple is explained using an example end application where change detection between two high-resolution satellite images for a location of interest is to be determined.

Figure 3B:
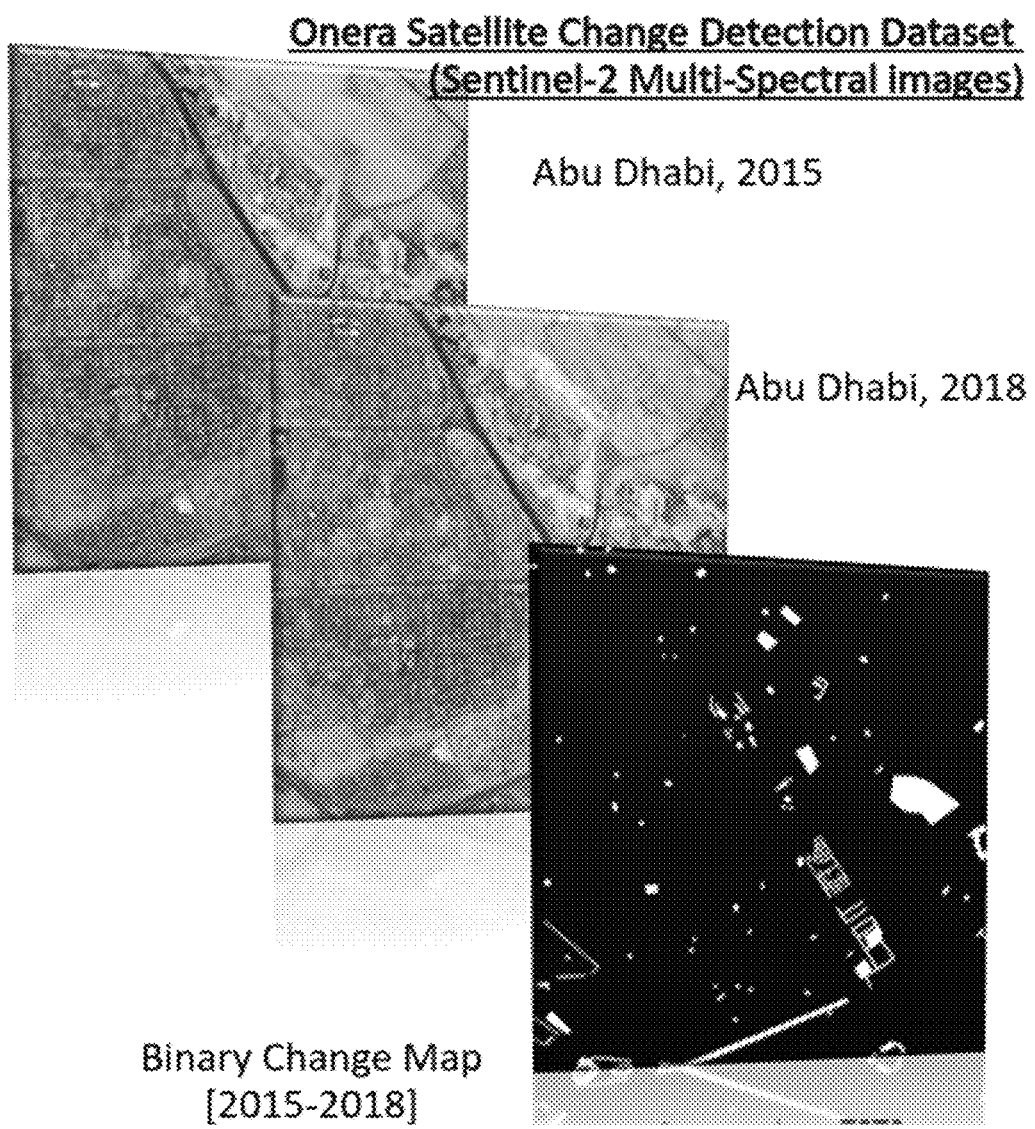

FIG. 3B are example satellite images depicting binary change detection and FIG. 3C and FIG. 3D depict a grid generated for a tuple of five metrics defining a size-performance criteria to, wherein the grid is used to obtain a patch-size and coverage percentage threshold, in accordance with some embodiments of the present disclosure. FIG. 3B depicts satellite images of a location (Abu Dhabi) at two different time instances (year 2015 and 2018 respectively) and a corresponding binary change map. Further, FIGS. 3C and 3D are 2D grids depicting metrics calculated between pixel level and patch level change maps for the images depicted in FIG. 3B. Each cell in the 2D grid represents a combination of [patch-size+coverage-threshold (interchangeably referred to as percentage threshold)]. The 5-metric tuple is calculated for each cell in the 2D grid (patch-size Vs coverage-threshold search grid). These 5-metrics are calculated between pixel-level segmentation map & patch-level segmentation map. For each cell within the 2D grid, 5-metric tuple per cell is defining expected performance of the patch-level classifier model, when that specific [patch-size+coverage-threshold] is chosen, when compared to pixel-level classifier model. Use one of the 2D grids depicted in FIG. 3C, 3D or 3E is combined with end-application constraints for the object of interest (constraints in terms of 5-metrics from the above-mentioned tuple). This helps reduce the search space/choices of [patch-size & % threshold] combinations that can be used for patch and label generation. Third dimension of % overlap between patches can also be added to the 2D grid. A simple heuristic to decide upon patch-size of last level of classifier among the hierarchical multi-stage SNN classier (high granularity level) is to pick a [patch-size+% threshold] combination where (Patch Area Coverage/Object of Interest Area Coverage) is a fraction in range [1.0,2.0], Object of Interest Area Coverage>>Threshold Area Coverage and remaining performance metrics are within LOWER & UPPER bounds defined as constraints, for the last level. Then work way upwards to second last layer where fractions can be used in range [2.0,5.0] and so on for layer before that (stop creating new levels when metrics value in our 2D grid doesn't satisfy LOWER & UPPER bounds defined by end-application constraints in terms of 5-metrics).

Example in terms of Cloud Cover Detection: Consider that clouds of size 3200 square-meter and above are to be detected and if the received satellite imagery is of 10 m spatial resolution, then an 8x8 px patch at 10 m spatial resolution encompasses an area of 6400 square-meter. Hence the ratio of (Patch_Area_Coverage/Object_of_Interest_Area_Coverage)=(6400/3200)=2. Then, all those cells with this ratio/fraction value lies between [1.0,2.0] and Object of Interest Area Coverage>>Threshold Area Coverage, can be shortlisted as [patch-size+coverage-threshold] combination, for last level in the hierarchical SNN architecture. Further, these shortlisted combinations can be matched against LOWER & UPPER bounds on remaining performance metrics to select final [patch-size+coverage-threshold] combination to start model training.

At step 206 of the method 200, the neuromorphic platform 112 performs a multi-class classification of each patch of the plurality of first size patches based on the plurality of threshold values determined for a first SNN classifier from among the plurality of SNN classifiers. Each patch is assigned a class label by the first SNN classifier for a classification objective, wherein the class labels comprise one of a) the clean patch b) the partially covered patch and c) the completely covered patch.

At step 208 of the method 200, the neuromorphic platform 112 identifies partial image of the high-resolution image that correspond to patches labelled as partially covered patch. At step 210 of the method 200, the neuromorphic platform 112 divides the identified partial image into a plurality of second size patches, wherein the second size is smaller than the first size, and is dynamically decided based on the size-performance criteria as explained above for first patch-sizes. For example, first size patches can be 64x64 pixels(px), while the second patch-sizes can be 8x8 px.

At step 212 of the method 200, the neuromorphic platform 112 performs a binary classification of each of the plurality of second size patches if the second SNN classifier is the last SNN classifier. The binary classification is based on the plurality of threshold values determined for a second SNN classifier from among the plurality of SNN classifiers. The class labels at the second level comprise a) the clean patch and b) highly covered patch. Even though the last level (second level) of the SNN architecture herein, is a binary classifier, it can be used in multi-class scenario using one vs all class setting, wherein the 'one' class is a class of interest. It can be noted that as the patch-size decreases (mask granularity increases), computation and power increase as number of inferences per scene increases and need for parallelism increases. Firstly, patch to patch-class classification used herein is an efficient approach compared to the conventional pixel-level approaches. Further, hierarchical approach on top of the patch to patch-class classification helps in power as well as computation reduction, by selectively sending patches to downstream patch classifier. The system neuromorphic platform 112, on an average over a whole dataset of the satellite imagery, send only 30% patches from stage-1 (64x64 px) to stage-2. Thus, additional power to process 70% of high-granular 64x64 px patches at low-granularity 8x8 px size is eliminated.

Further, in one embodiment, the classification process takes place for each patch at each level. However, in an alternative embodiment, the [hierarchical+patch-level classification/segmentation] approach can be combined with Encoder-Decoder models at each hierarchy, which yields further power saving, because Encoder-Decoder models are capable of dense classification (dense patch-level classification/segmentation), wherein one classification model can take multiple patches as input and can output class labels for all patches simultaneously.

Even though the method 200 is explained with reference to two-level hierarchical approach, the number levels of SNN classifiers in the hierarchical multi-stage SNN classifier is not limited to two, but is defined as a function of size of object of interest in square-meters, spatial resolution of the high-resolution satellite image in meters, acceptable patch-level (UPPER & LOWER bound) performance defined in terms of evaluation metrics (as mentioned in 5-metrics tuple) and power budget of a single satellite and satellite constellation. Above, it is already mentioned about how to use (calculate a ratio/fraction using Patch Area Coverage, Area Covered by object of interest & Spatial resolution of satellite image combined with end-application constraints (UPPER & LOWER bounds) in terms of 5-metric tuple to decide [patch-size+coverage-threshold] for one level (last level) in hierarchy. Same process can be repeated for number of SNN levels before last level, by deciding upon ratio/fraction range like [3.0,5.0], shortlist [bigger patch-size compared to last level+coverage-threshold] combination & select a final combination that satisfies end-application constraints (UPPER & LOWER bounds) in terms of 5-metric tuple. Levels in hierarchy are linked such that not all patches from previous levels are sent to next level (selective patches belonging to certain class labels at level L−1 are sent to level L).

Further, hierarchical multi-stage approach has been attempted to be used by a recent work in literature 'Hierarchical Medical Image Classification, A Deep Learning Approach' by Kamran Kowsari et. al'. However, this work in the art focusses on usage of conventional CNN and differs in strategy of patch and label generation as it relies on unsupervised autoencoder combined with k-means clustering (in latent space) to find similar patches and then label them based on disease (& disease severity) present in high-resolution image. This is a more complex approach, effectively requiring more computational power, which is one of the major constraints to be addressed. However, the hierarchical SNN architecture disclosed herein, the patch and label generation is based on domain knowledge and pixel-level segmentation map available beforehand for remote-sensing high-resolution image. This enables providing an onboard low-power remote-sensing meta-data generation system for efficient utilization of onboard storage and communication bandwidth.

Once labels are assigned to patches across the hierarchical classification levels, at step 214 of the method 200, the system 100 generates a patch level segmentation map of the high-resolution image by aggregating class labels at each level. It can be noted that the number of partially covered class labels are tunable based on end application requirements and vary from none to plurality of distinct partially covered classes based on corresponding percentage threshold values for each of the partially covered class.

At step 216 of the method 200, the system 100 computes overall percentage cover for the entire high-resolution image by analyzing area covered by patches labelled as clean patches based on the class labels at each level. At step 218 of the method 200, the system 100 marks the image as highly covered image if the overall percentage cover of the high-resolution image is above a predefined cover threshold. The high-resolution image, if tagged as highly covered image, is discarded, or processed in accordance with an end application of interest. For example, depicted in FIG. 3A, the covered image refers to cloudy image and is of no use for further inferencing and can be discarded.

Further, based on the end application of interest, the high-resolution image, if tagged as highly covered image, are either a) discarded or b) processed further for deriving insights. In the satellite onboard processing example explained above, the highly covered images refer to cloudy images and are of no use to the ground station for deriving insights. Thus, they are discarded, and the communication BW that may have been consumed in transferring these 'Information less' images is saved. Such images are then discarded. However, in another example, the fully covered images may be of interest and in such cases, partially covered and/or clean images may be discarded and discarding decision is flexible based on end application.

Figure 4A:
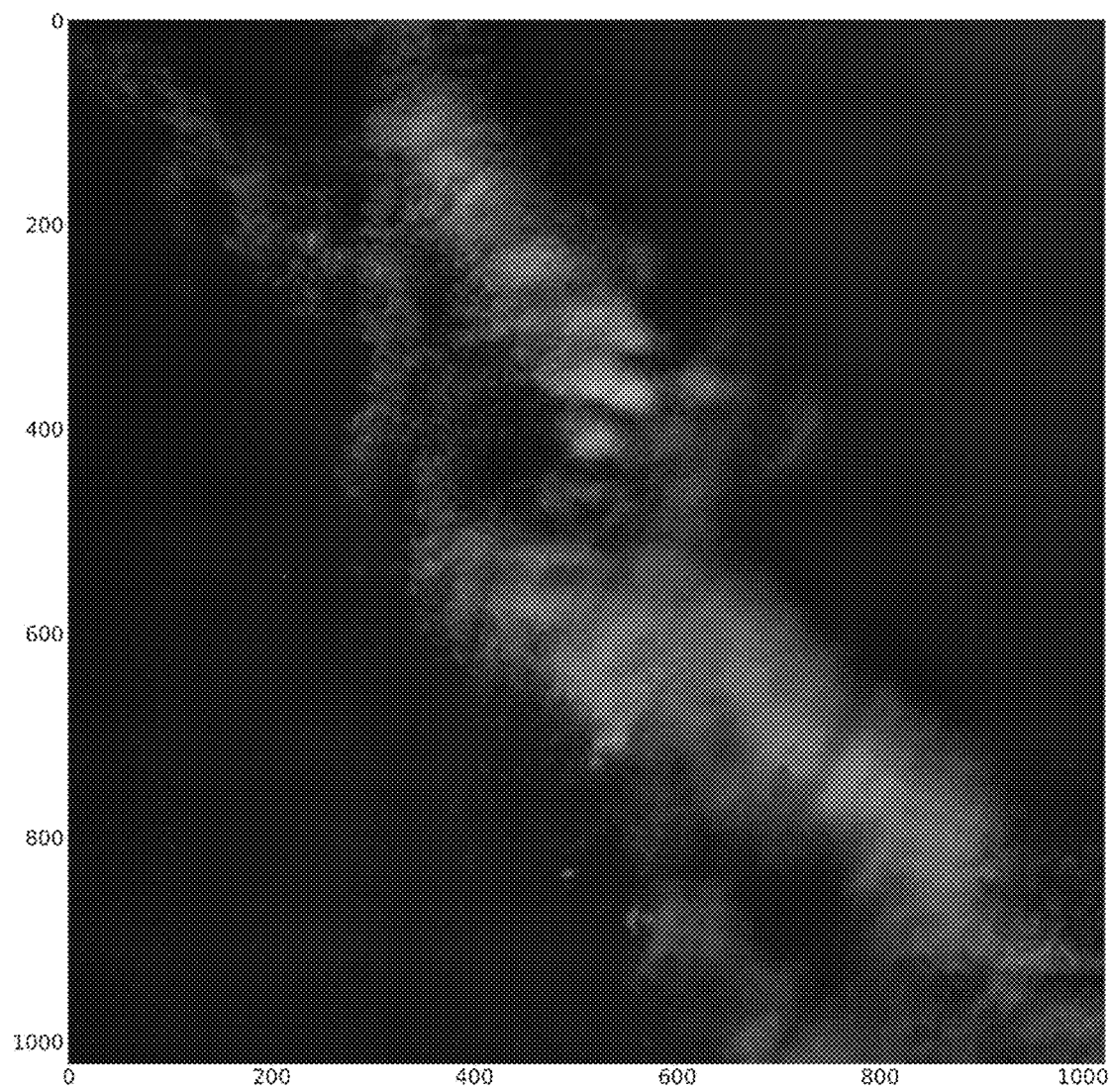
FIGS. 4A through 4G (collectively referred as FIG. 4) are illustrative example of patch generation and corresponding label generation for an input image, intermediate patch based classified images at two levels of classification and final segmented images generated by the system of FIG. 1, in accordance with some embodiments of the present disclosure.
Figure 4B:
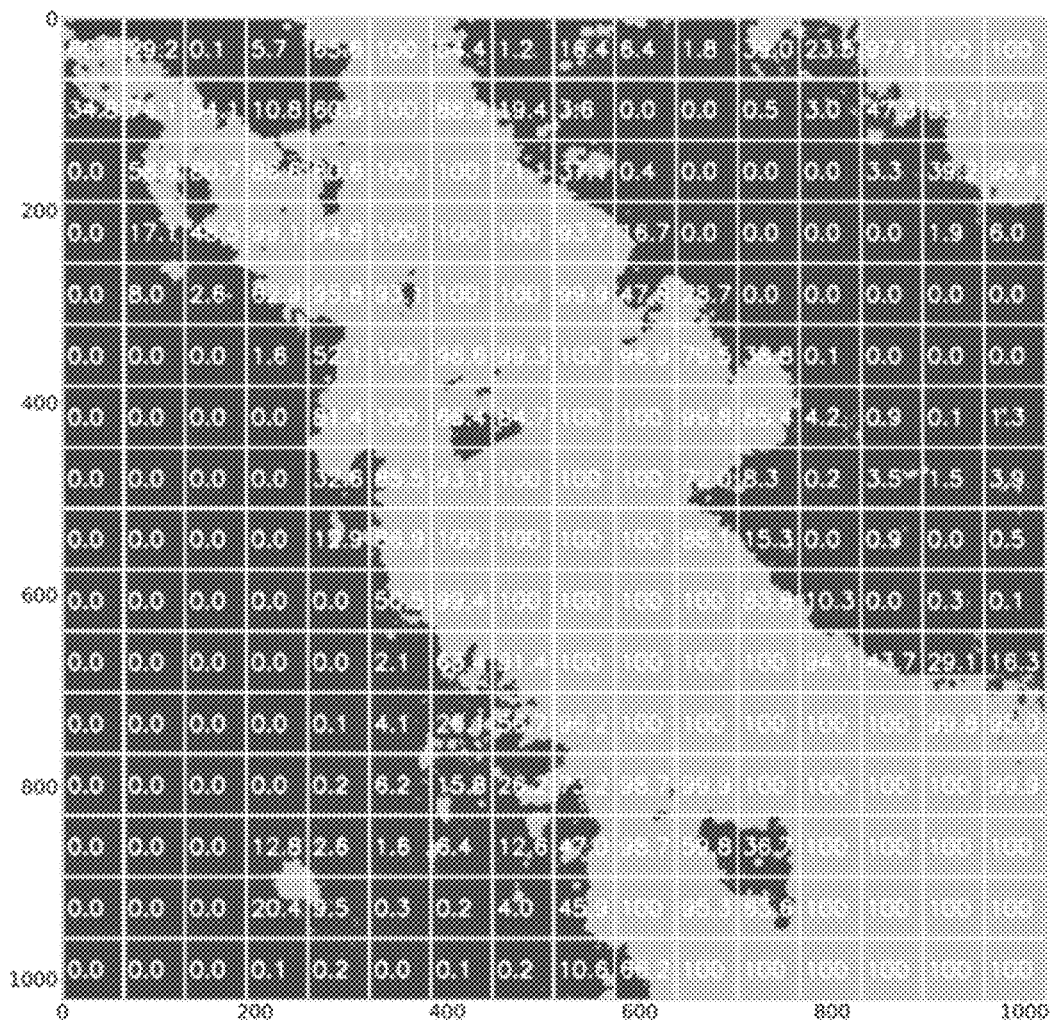
Figure 4C:
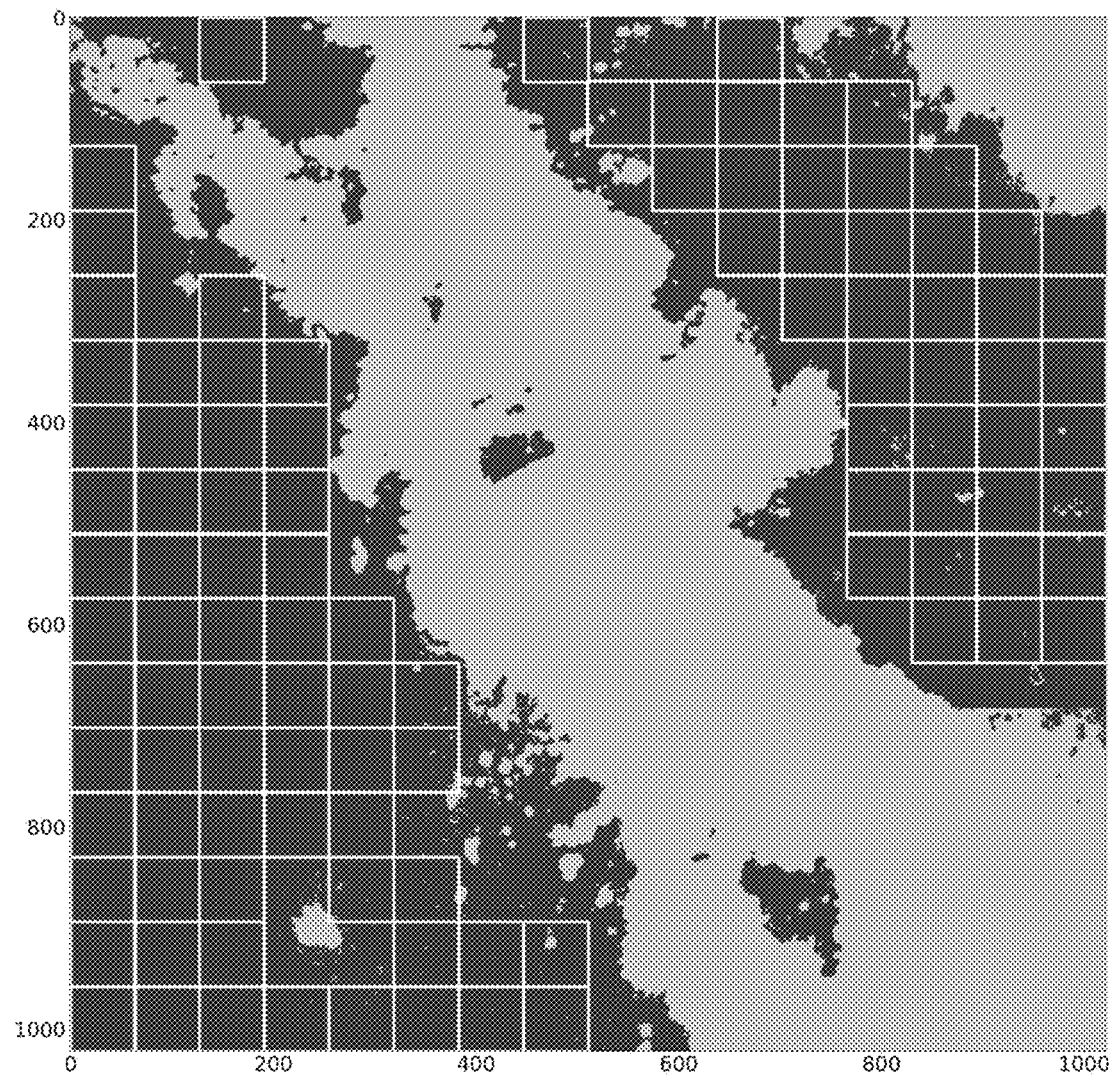
Figure 4D:
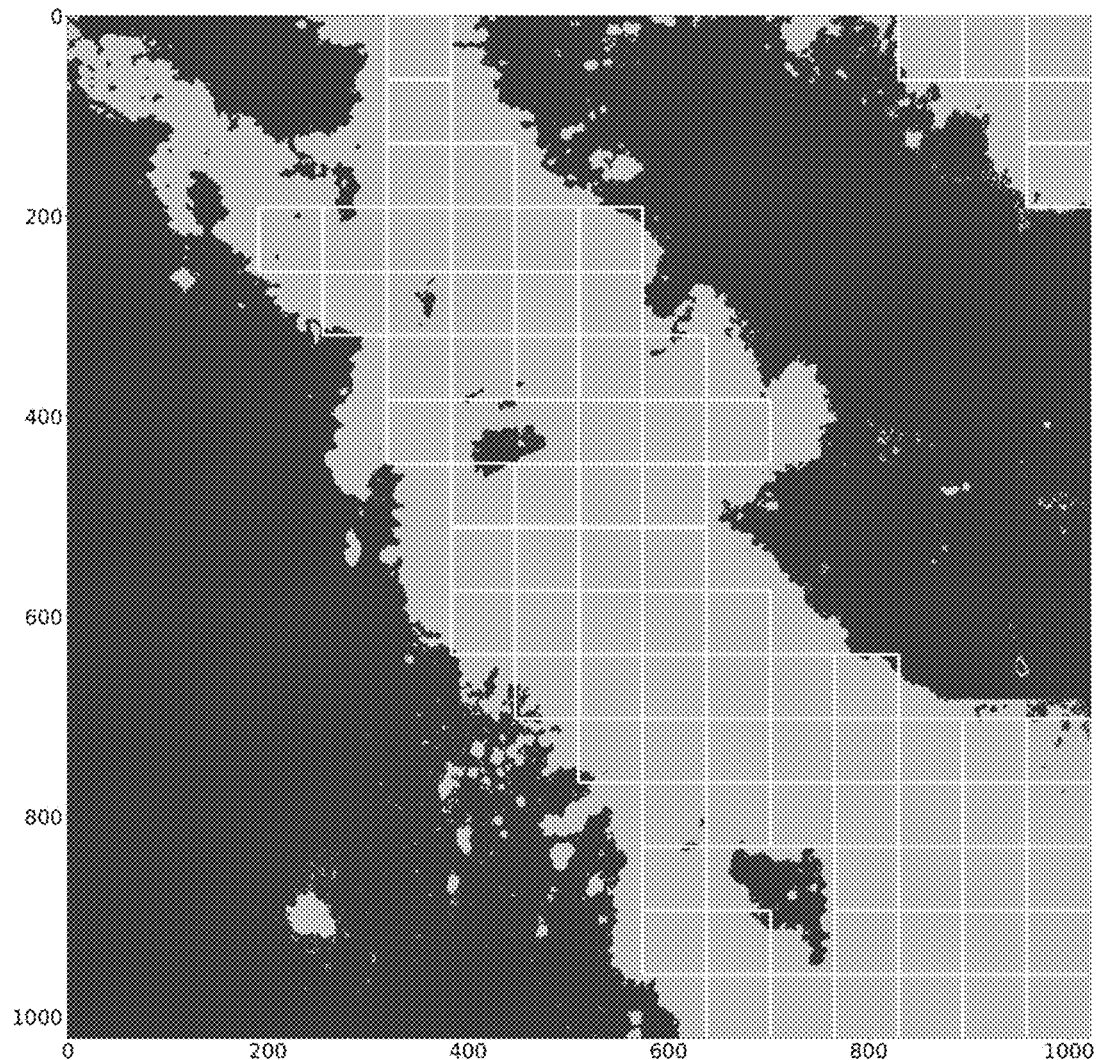
Figure 4E:
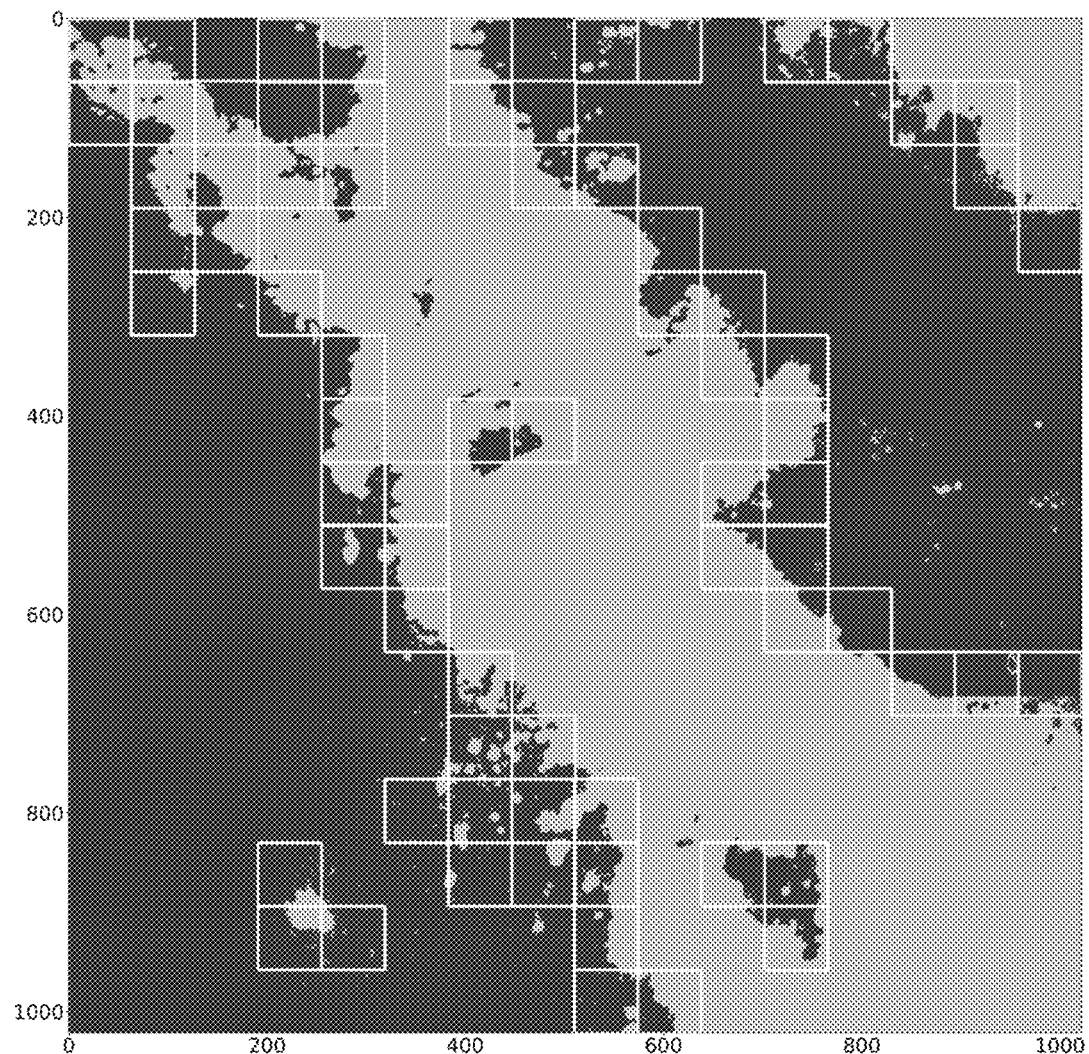
Figure 4F:
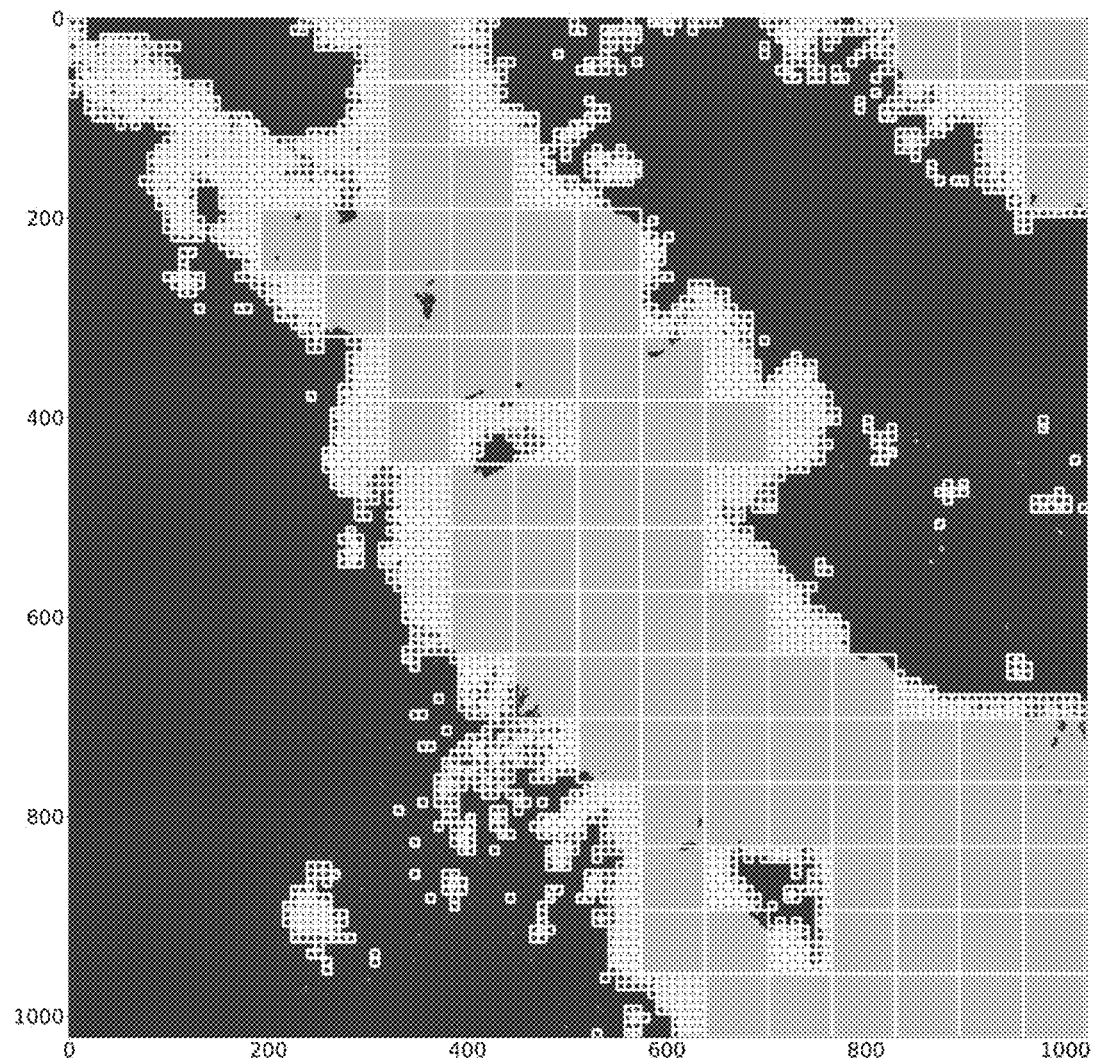
Figure 4G:
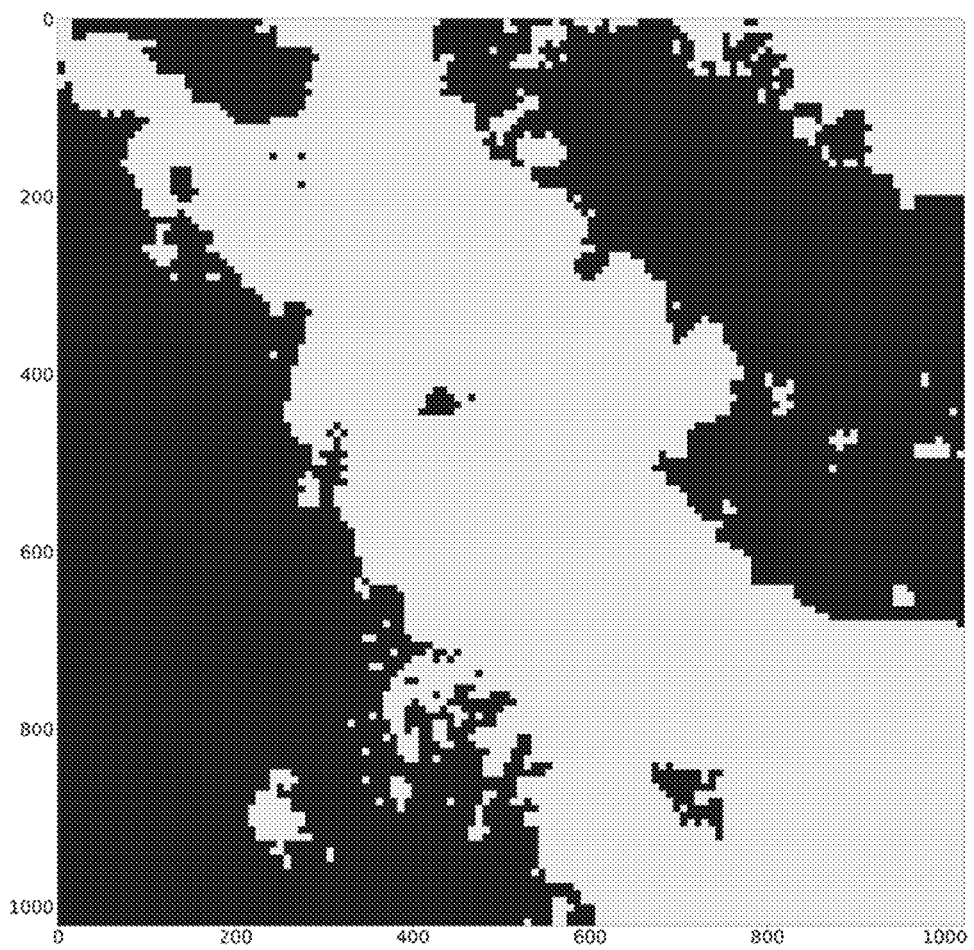

FIGS. 4A through 4G (collectively referred as FIG. 4) are illustrative example input image, intermediate patch based classified images two levels and final segmented images generated by the system of FIG. 1, in accordance with some embodiments of the present disclosure. FIG. 4A, is representative RGB high-resolution image captured by the imaging hardware 110. However, in the example herein, the RGB image is taken from the Sentinel-2 Test Image to demonstrate Patch & Label generation (training data) for Cloud Cover Detection. FIG. 4B depicts ground truth pixel-level cloud mask of the test image overlapped with percent cloud coverage in each 64x64 px patch. Thus, the image divided into first size patches with % cloud cover depicted for each patch. FIG. 4C depicts ground truth pixel-level cloud mask of test image overlapped with CLEAR 64x64 px patches (thick white boundary boxes) indicating patches corresponding to clear labels (no clouds). FIG. 4D depicts ground truth pixel-level cloud mask of the test image overlapped with CLOUDY 64x64 px patches (thick white boundary boxes), indicating patches with completely covered labels (full cloudy patches)/FIG. 4E depicts ground truth pixel-level cloud mask of test image overlapped with PARTLY_CLOUDY 64x64 px patches (thick white boundary boxes), indicating patches partially covered labels (partially cloudy or border patches) respectively. FIG. 4F depicts ground truth pixel-level cloud mask of test image overlapped with ground truth CLOUDY patches for both Stage-1 [64x64 px] and Stage-2 [8x8 px] (thick white boundary boxes). Thus, image portion labelled as partially cloudy (FIG. 4E) is selected for second level classification and the and divided into the second patch-size of lower dimension (selected in accordance with the size-performance criteria) as depicted in FIG. 4F. FIG. 4G depicts ground truth patch-level cloud mask generated from ground truth pixel-level cloud mask (by applying threshold on percentage cloud pixels within a patch). Bigger bounding boxes are 64x64 px patches (first level SNN with first size patches) labelled as PARTLY_CLOUDY by stage-1 3-class classifier. Smaller bounding boxes are 8x8 px patches labelled as CLOUDY by stage-2 binary classifier (second level SNN with second size patches). The 2-stage or second level classifier provides a fine grained but coarse cloud mask at output acceptable for further processing. Thus, Stage-1 3-class classifier maximizes detection of PARTLY_CLOUDY class. Stage-2 binary classifier maximizes detection for CLOUDY class.

Figure 5A:
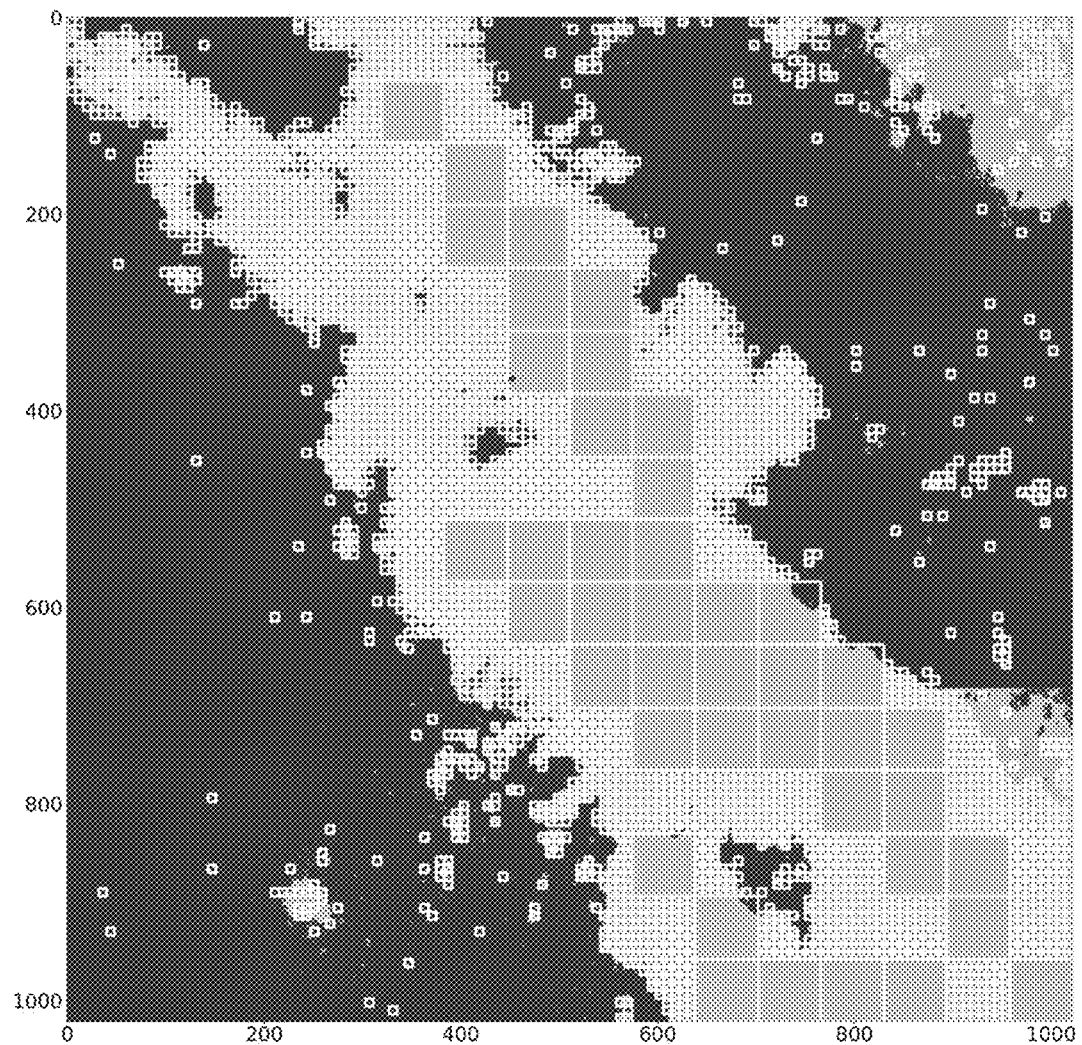
FIG. 5A through 5B (collectively referred as FIG. 5) depict segmentation performed by the system of FIG. 1 as compared to conventional CNN based state of the art pixel-level segmentation methods, in accordance with some embodiments of the present disclosure.
Figure 5B:
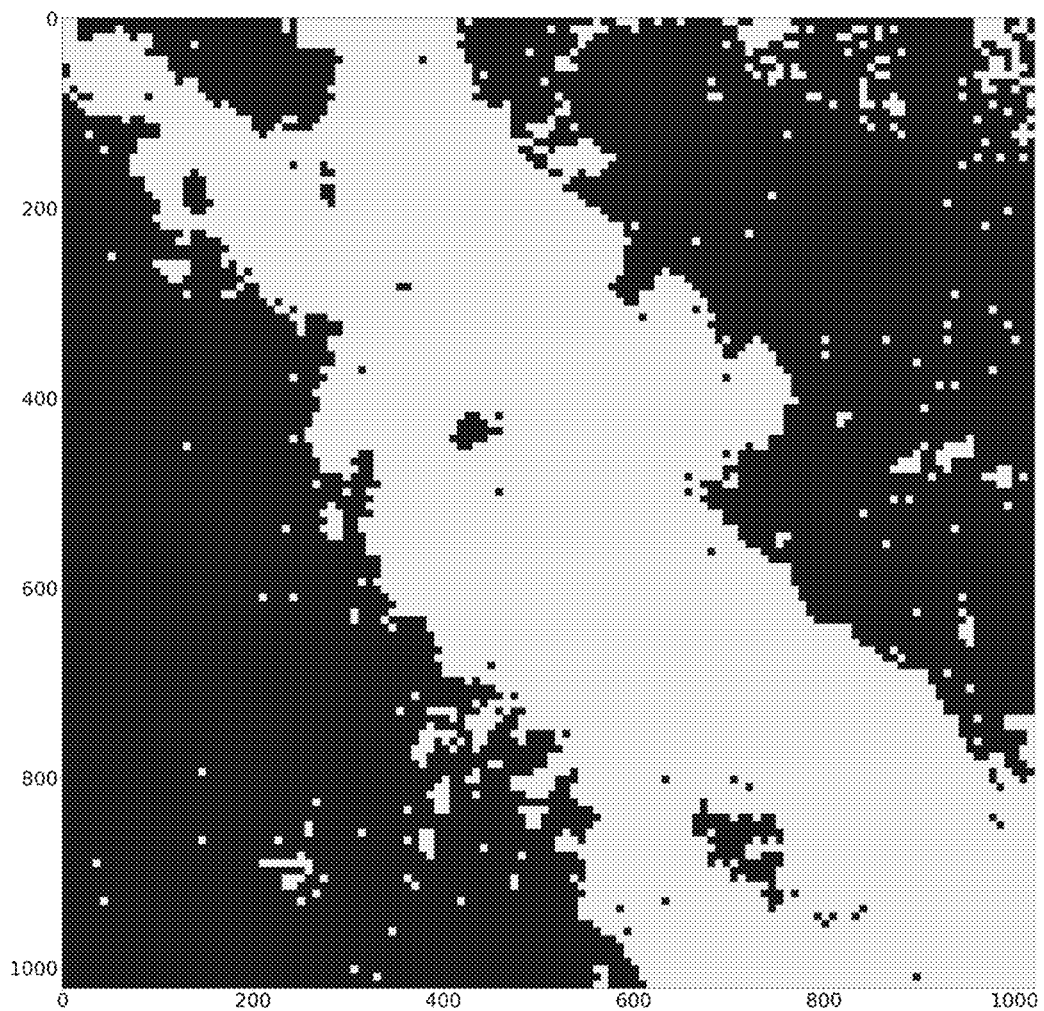

FIG. 5A through 5B (collectively referred as FIG. 5) depict segmentation performed by the system of FIG. 1 as compared to conventional CNN based state of the art pixel-level segmentation methods, in accordance with some embodiments of the present disclosure. With reference to FIG. 4A, which is the original RGB image, FIG. 5A depicts ground truth pixel-level cloud mask of test image overlapped with predicted CLOUDY patches by both Stage-1 SNN classifier [64x64 px] and Stage-2 SNN classifier [8x8 px] (thick white boundary boxes) FIG. 5B final predicted patch-level cloud mask (coarse granular patch-level segmentation map) generated by 2-Stage Hierarchical SNN (where the 2-Stage Hierarchical SNN is trained on patch-level labels generated by applying threshold on percentage cloud pixels within a patch).

Experiments and Results: Two sets of evaluation metrics are used. One set to gauge the performance at patch-level and another set to gauge the performance at whole image level when patch-level predicted segmentation map is compared to pixel-level ground truth segmentation map (once class labels assigned by both stages are combined to generate a patch-level segmentation map for high-resolution image).

At patch-level focus is on two metrics: Accuracy and Recall. Accuracy tells overall performance over all class labels of classifier. Recall tells detection rate of one specific class label of your classifier, because it is often the case that maximize model performance is desired for one specific class label (e.g., training a model to maximize CLOUDY class recall/detection). At whole image level focus is on two metrics: Pixelwise Accuracy and Mean-Intersection over Union (Mean-IoU), which is also known as Jaccard index and Jaccard index indicates how well the predicted & ground truth segmentation map overlaps).

Table 1, below provides comparative analysis of the system 100 with state of the art methods at patch level performance evaluation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented

TABLE 1

| INPUT DATA | PREPROCESSING | Network Arch | METRIC | CNN Test Set Metrics (before quantization) | CNN Test Set Metrics (after quantization and SNN conversion) |
|---|---|---|---|---|---|
| 13 Channel RAW Pixel Data | {CONV 3 × [1 × 1/1], ReLU(max = 1.0)} and convert to unsigned 8-bit INT | STAGE-1: 3-Class CNN Classifier Input: [64 × 64 × 3] image patch Output: {0: CLEAR, 1: PARTLY_CLOUDY, 2: CLOUDY} | Macro Average Precision | 0.8217 | 0.7395 |
| | | | PARTLY CLOUDY Recall | 0.8566 | 0.8823 |
| | | Stage-2: Binary CNN Classifier Input: [8 × 8 × 3] image patch Output: {0: CLEAR, 1: CLOUDY} | CLOUDY Precision | 0.6099 | 0.7539 |
| | | | CLOUDY Recall | 0.9462 | 0.8475 |

Thus, the method and system disclosed herein provides a generic low power solution for high-resolution image segmentation, wherein the patch-size to improve granularity in segmentation, and level of classifiers to enhance accuracy of segmentation is dynamically decided based on requirements of the end application requirements. Its multilevel classifier approach that enhances image classification accuracy while still being power efficient using complete SNN architecture based segmentation approach.

It can be noted that all images used herein are from public dataset such as Sentinel-2 Multi-Spectral images, for mere illustration and explanation purposes.

in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for classification and segmentation of high-resolution images, the method comprising:
receiving, via one or more hardware processors, a high-resolution image;
dividing, by a neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier;
performing, by the neuromorphic platform, a multi-class classification of each patch of the plurality of first size patches based on the plurality of threshold values determined for the first SNN classifier of the neuromorphic platform, from among the plurality of SNN classifiers, wherein each patch is assigned a class label by the first SNN classifier for a classification objective, wherein the class labels comprise one of a) the clean patch b) the partially covered patch and c) the completely covered patch;
identifying, by the neuromorphic platform, a partial image of the high-resolution image that correspond to patches labelled as partially covered patch;
dividing, by the neuromorphic platform, the identified partial image into a plurality of second size patches;
performing, by the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch;
generating, by the neuromorphic platform, a patch level segmentation map of the high-resolution image by aggregating class labels at each level;
computing, by the one or more hardware processors, an overall percentage cover for the high-resolution image by analyzing area covered by the patches labelled as clean patches based on the class labels at each level; and
marking, by the one or more hardware processors, the high-resolution image as a highly covered image if the overall percentage cover of the high-resolution image is above a predefined cover threshold.

2. The method of claim 1, wherein the high-resolution image, if tagged as highly covered image, is either discarded or processed in accordance with an end application of interest.

3. The method of claim 1, wherein number of levels formed by the plurality of SNN classifiers in the hierarchical multi-stage SNN classifier, during onboard classification and segmentation of high-resolution satellite image, is defined as a function of size of object of interest in meters, spatial resolution of the high-resolution satellite image in meters, and a combined power budget of a single satellite and satellite constellation.

4. The method of claim 1, wherein each of the plurality of classifiers in the hierarchical multi-stage SNN classifier except the last SNN classifier is a multi-class classifier with classification into two or more labels, whereas the last SNN classifier is a binary classifier.

5. The method of claim 1, wherein the patch-size and the plurality of threshold values at each level are dynamically tunable based on requirements set by end application for which segmentation is carried out and are chosen prior to model training of each of the hierarchical multi-stage SNN classifier, based on a grid generated for each of the five metrics.

6. The method of claim 5, wherein the grid of each of the five metrics is used as a guide to select an appropriate patch-size and percentage threshold for each of the SNN classifiers in the hierarchical multi-stage SNN classifier, wherein metrics within each grid cell of the grid are calculated between a ground truth pixel-level segmentation map and a generated patch-level segmentation map post patch-size and percentage threshold selection, wherein,
the threshold pixel coverage refers to capability of a perfect-CNN classifier to detect coverage within the patch to at least as many pixels as this metric, wherein the perfect CNN refers to a trained patch-level CNN tuned for highest performance, the threshold area coverage refers to capability of the perfect-CNN classifier to detect coverage within the patch to at least as many square-meter area as this metric, the pixelwise accuracy refers to a maximum pixelwise accuracy achieved by the perfect-CNN classifier with specific patch-size and percentage threshold combination, the classwise-IoU refers to a maximum classwise-IoU achieved by the perfect-CNN classifier with the specific patch-size and percentage threshold combination, and the mean-IoU is a Jaccard Index referring to a maximum Mean-IoU achieved by the perfect-CNN classifier achieved with the specific patch-size and percentage threshold combination.

7. The method of claim 1, wherein number of partially covered class labels are tunable based on end application requirements and vary from none to plurality of distinct partially covered classes based on corresponding percentage threshold values for each of the partially covered class.

8. A system for classification and segmentation of high-resolution images, the system comprising:
   a memory storing instructions;
   one or more Input/Output (I/O) interfaces;
   one or more hardware processors coupled to the memory via the one or more I/O interfaces; and a neuromorphic platform, wherein the one or more hardware processors are configured by the instructions to:
     receive a high-resolution image, via an imaging hardware;
     divide via the neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier;
     perform via the neuromorphic platform, a multi-class classification of each patch of the plurality of first size patches based on the plurality of threshold values determined for the first SNN classifier of the neuromorphic platform, from among the plurality of SNN classifiers, wherein each patch is assigned a class label by the first SNN classifier for a classification objective, wherein the class labels comprise one of a) the clean patch b) the partially covered patch and c) the completely covered patch;
     identify via by the neuromorphic platform, a partial image of the high-resolution image that correspond to patches labelled as partially covered patch;
     dividing via the neuromorphic platform, the identified partial image into a plurality of second size patches;
     perform via the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch;
     generate via the neuromorphic platform, a patch level segmentation map of the high-resolution image by aggregating class labels at each level;
     compute an overall percentage cover for the high-resolution image by analyzing area covered by the patches labelled as clean patches based on the class labels at each level; and
     mark the high-resolution image as a highly covered image if the overall percentage cover of the high-resolution image is above a predefined cover threshold.

9. The system of claim 8, wherein the high-resolution image, if tagged as highly covered image, is either discarded or processed in accordance with an end application of interest.

10. The system of claim 8, wherein number of levels formed by the plurality of SNN classifiers in the hierarchical multi-stage SNN classifier, during onboard classification and segmentation of high-resolution satellite image, is defined as a function of size of object of interest in meters, spatial resolution of the high-resolution satellite image in meters, and a combined power budget of a single satellite and satellite constellation.

11. The system of claim 8, wherein each of the plurality of classifiers in the hierarchical multi-stage SNN classifier except the last SNN classifier is a multi-class classifier with classification into two or more labels, whereas the last SNN classifier is a binary classifier.

12. The system of claim 8, wherein the patch-size and the plurality of threshold values at each level are dynamically tunable based on requirements set by end application for which segmentation is carried out and are chosen prior to model training of each of the hierarchical multi-stage SNN classifier, based on a grid generated for each of the five metrics.

13. The system of claim 12, wherein the grid of each of the five metrics is used as a guide to select an appropriate patch-size and percentage threshold for each of the SNN classifiers in the hierarchical multi-stage SNN classifier, wherein metrics within each grid cell of the grid are calculated between a ground truth pixel-level segmentation map and a generated patch-level segmentation map post patch-size and percentage threshold selection, wherein,
   the threshold pixel coverage refers to capability of a perfect-CNN classifier to detect coverage within the patch to at least as many pixels as this metric, wherein the perfect CNN refers to a trained patch-level CNN tuned for highest performance,
   the threshold area coverage refers to capability of the perfect-CNN classifier to detect coverage within the patch to at least as many square-meter area as this metric,
   the pixelwise accuracy refers to a maximum pixelwise accuracy achieved by the perfect-CNN classifier with specific patch-size and percentage threshold combination,
   the classwise-IoU refers to a maximum classwise-IoU achieved by the perfect-CNN classifier with the specific patch-size and percentage threshold combination, and
   the mean-IoU is a Jaccard Index referring to a maximum Mean-IoU achieved by the perfect-CNN classifier achieved with the specific patch-size and percentage threshold combination.

14. The system of claim 8, wherein number of partially covered class labels are tunable based on end application requirements and vary from none to plurality of distinct partially covered classes based on corresponding percentage threshold values for each of the partially covered class.

15. One or more non-transitory machine-readable information storage mediums comprising one or more instructions which when executed by one or more hardware processors cause:

receiving, a high-resolution image;

dividing, by a neuromorphic platform, the high-resolution image into a plurality first size patches, wherein a patch-size at each level of a hierarchical multi-stage SNN classifier, and a plurality percentage threshold values defining a) a clean patch, b) a partially covered patch, and c) a completely covered patch at each level of the hierarchical multi-stage SNN classifier are determined based on a size-performance criteria derived using a tuple of five metrics comprising: a) threshold pixel coverage, b) threshold area coverage, c) pixelwise accuracy, d) classwise-Intersection over Union (IoU), and e) Mean-IoU, and wherein the patch-size decreases gradually from a first SNN classifier to a last SNN classifier of a plurality of SNN classifiers of the hierarchical multi-stage SNN classifier;

performing, by the neuromorphic platform, a multi-class classification of each patch of the plurality of first size patches based on the plurality of threshold values determined for the first SNN classifier of the neuromorphic platform, from among the plurality of SNN classifiers, wherein each patch is assigned a class label by the first SNN classifier for a classification objective, wherein the class labels comprise one of a) the clean patch b) the partially covered patch and c) the completely covered patch;

identifying, by the neuromorphic platform, a partial image of the high-resolution image that correspond to patches labelled as partially covered patch;

dividing, by the neuromorphic platform, the identified partial image into a plurality of second size patches;

performing, by the neuromorphic platform, a binary classification of each of the plurality of second size patches if the second SNN classifier is the last SNN classifier, wherein the binary classification is based on the plurality of threshold values determined for a second SNN classifier from among the plurality of classifiers, wherein the class labels comprise a) the clean patch, and b) the completely covered patch;

generating, by the neuromorphic platform, a patch level segmentation map of the high-resolution image by aggregating class labels at each level;

computing an overall percentage cover for the high-resolution image by analyzing area covered by the patches labelled as clean patches based on the class labels at each level; and marking the high-resolution image as a highly covered image if the overall percentage cover of the high-resolution image is above a predefined cover threshold.

16. The one or more non-transitory machine-readable information storage mediums of claim 15, wherein the high-resolution image, if tagged as highly covered image, is either discarded or processed in accordance with an end application of interest.

17. The one or more non-transitory machine-readable information storage mediums of claim 15, wherein number of levels formed by the plurality of SNN classifiers in the hierarchical multi-stage SNN classifier, during onboard classification and segmentation of high-resolution satellite image, is defined as a function of size of object of interest in meters, spatial resolution of the high-resolution satellite image in meters, and a combined power budget of a single satellite and satellite constellation.

18. The one or more non-transitory machine-readable information storage mediums of claim 15, wherein each of the plurality of classifiers in the hierarchical multi-stage SNN classifier except the last SNN classifier is a multi-class classifier with classification into two or more labels, whereas the last SNN classifier is a binary classifier.

19. The one or more non-transitory machine-readable information storage mediums of claim 15, wherein the patch-size and the plurality of threshold values at each level are dynamically tunable based on requirements set by end application for which segmentation is carried out and are chosen prior to model training of each of the hierarchical multi-stage SNN classifier, based on a grid generated for each of the five metrics.

20. The one or more non-transitory machine-readable information storage mediums of claim 19, wherein the grid of each of the five metrics is used as a guide to select an appropriate patch-size and percentage threshold for each of the SNN classifiers in the hierarchical multi-stage SNN classifier, wherein metrics within each grid cell of the grid are calculated between a ground truth pixel-level segmentation map and a generated patch-level segmentation map post patch-size and percentage threshold selection, wherein, the threshold pixel coverage refers to capability of a perfect-CNN classifier to detect coverage within the patch to at least as many pixels as this metric, wherein the perfect CNN refers to a trained patch-level CNN tuned for highest performance, the threshold area coverage refers to capability of the perfect-CNN classifier to detect coverage within the patch to at least as many square-meter area as this metric, the pixelwise accuracy refers to a maximum pixelwise accuracy achieved by the perfect-CNN classifier with specific patch-size and percentage threshold combination, the classwise-IoU refers to a maximum classwise-IoU achieved by the perfect-CNN classifier with the specific patch-size and percentage threshold combination, and the mean-IoU is a Jaccard Index referring to a maximum Mean-IoU achieved by the perfect-CNN classifier achieved with the specific patch-size and percentage threshold combination.

\* \* \* \* \*